United States Patent [19]
Nommensen

[11] 3,975,274
[45] Aug. 17, 1976

[54] PROCESS AND DEVICE FOR FILTERING MEDIA

[75] Inventor: Johan P. Nommensen, Stein, Netherlands

[73] Assignee: Stamicarbon B.V., Geleen, Netherlands

[22] Filed: Jan. 16, 1975

[21] Appl. No.: 541,691

[30] Foreign Application Priority Data
Jan. 17, 1974 Netherlands .................... 7400613

[52] U.S. Cl. ............................. 210/82; 210/412; 210/497.1
[51] Int. Cl.² .................... B01D 25/20; B01D 25/34
[58] Field of Search ............. 210/82, 323 T, 333 R, 210/350–352, 497.1, 498, 411, 412

[56] References Cited
UNITED STATES PATENTS

| | | |
|---|---|---|
| 2,084,433 | 6/1937 | Chorlton .................... 210/497.1 X |
| 2,133,004 | 10/1938 | Williams et al. ................ 210/497.1 |
| 2,429,417 | 10/1947 | Magill ......................... 210/497.1 X |
| 2,569,748 | 10/1951 | De Grave ..................... 210/497.1 X |
| 2,856,076 | 10/1958 | Whipple .......................... 210/352 |
| 3,216,572 | 11/1965 | Kasten ......................... 210/352 X |

Primary Examiner—Charles N. Hart
Assistant Examiner—Robert H. Spitzer
Attorney, Agent, or Firm—Cushman, Darby & Cushman

[57] ABSTRACT

The invention relates to filter candles of the type in which the fluid medium flows through a circumferential wall into the interior of the filter and the particles are collected at the outside. The circumferential wall is formed of sectional members defining narrow slots between them. At intervals the stream of fluid is interrupted and a reverse fluid pressure pulse is effected in the fluid inside the filter of sufficient magnitude to enlarge the slots to create a back flow of fluid through the enlarged slots to remove thereby the accumulated particles from the slots.

6 Claims, 3 Drawing Figures

PROCESS AND DEVICE FOR FILTERING MEDIA

This invention relates to filters and filtering methods and in particular to filter candles of the type in which the fluid medium flows through a circumferential wall into the interior of the filter, the circumferential wall having a continuous slot or a plurality of slots therein of such narrow width that solid particles do not pass therethrough.

Slotted filter candles of the general type contemplated are known from Swiss patent specification No. 438,220 and French patent specification Nos. 783,203 and 2,088,713. These patents are incorporated by reference. The known filter candles have the drawback that, if the slots are very narrow, e.g., in the order of 20 μ or smaller, they are difficult to clean by reversing the direction of flow of the filtrate because of the high filtration resistance. In most cases it is necessary to dismantle them for cleaning, in order that they can be treated with chemical agents, for instance with a dilute caustic solution if they should be contaminated by silicate components.

The object of the invention is to provide a process which makes it possible to effect a proper cleaning action in slotted filter candles with a small slot width by reversing the direction of flow and in which the amount of medium washed back remains small.

According to the invention this can be achieved if use is made of a slotted filter candle in which the openings or slots between the sectional members which form the filter do not exceed about 20 microns in width, and the sectional members are fastened, at least in three points, to stay rods mounted approximately parallel to the axis of symmetry. The whole of the connected sectional members is kept compressed during the filtration by means of a tension member. The filtration is interrupted at regular intervals and the direction of flow of the fluid medium is reversed and at the same time a short reverse pressure pulse of such strength is exerted on the inner surface of the bottom of the filter candle that the openings between the sectional members are enlarged by more than 5%, while the pretension is so adjusted that the pressure pulse virtually relieves the stay rods. The slot width is thereby enlarged during the pressure pulse, and particles caught in the slot are loosened and removed with the adhering filter cake. Each pressure pulse returns a controlled equal amount of filtrate during the fixed short time of the pressure pulse.

The invention will be described with reference to an embodiment of a filter candle for carrying out the present process. The invention is not restricted to the use of the specific filter candle which is illustrated. Various constructions are possible. The drawing shows:

Figure 1:
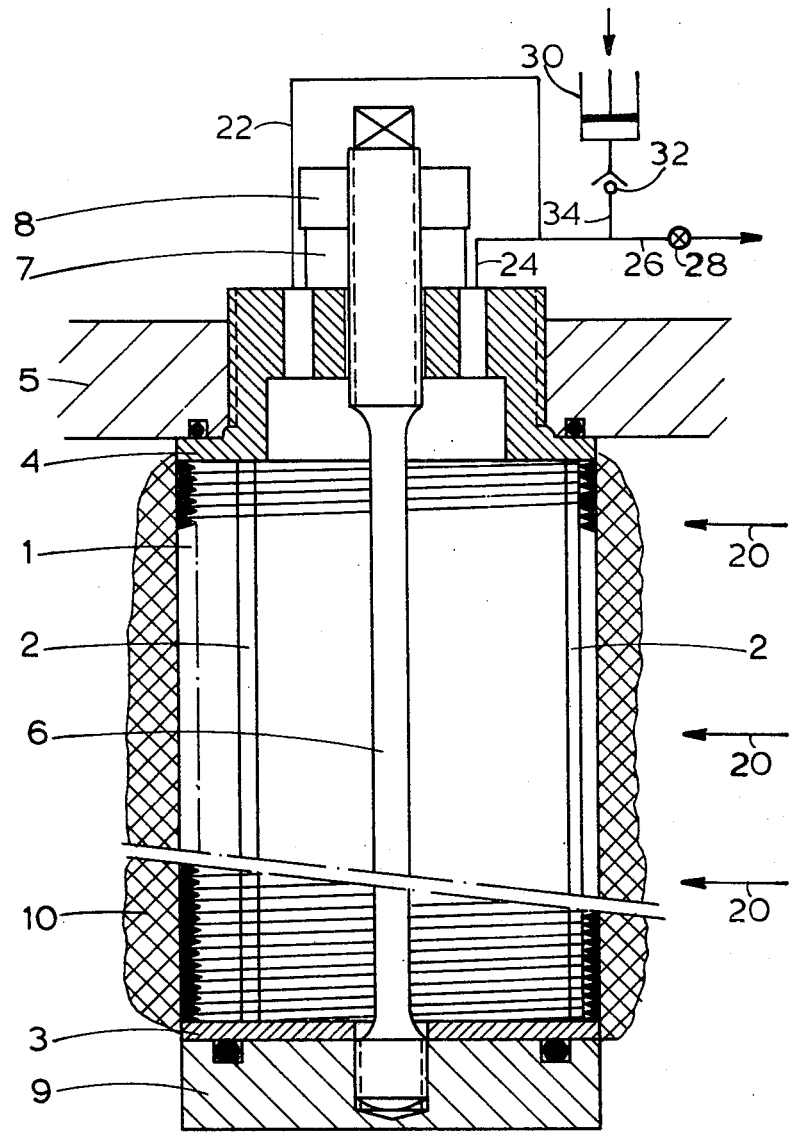
FIG. 1 is a vertical sectional view of a filter candle.

In FIG. 1 there is shown a filter candle made up from helical sectional members 1 formed by sectional wire wound into a helix so as to form slots between the members 1. The distance between these sectional members 1 is, for instance, about 7 microns. The sectional members 1 are fastened to stay rods 2, two of which are shown in the figure. The distance between the stay rods 2 is usually about 15 mm, and the stay rods are disposed uniformly about the axis of symmetry. The assembly of sectional members 1 and rods 2 is closed at the bottom by means of a bottom plate 3 and fixed at the top to a threaded connecting part 4, which is screwed into a cover 5. The assembly is compressed axially by means of a pretensioned central tension rod 6, having a threaded upper end which is provided with a tightening nut 7 and a lock nut 8. The lower end of the rod 6 is fastened to a stay plate 9 which is mounted under the bottom plate 3. The central tension rod 6 must be so dimensioned that, at the required tension, the limit of elasticity of the material is not exceeded during the fluid pressure pulse which is applied to the interior of the filter. It is moreover desirable that the tension rod 6 is so shaped that fatigue fracture owing to the highly frequent pressure pulses can hardly occur.

Figure 2:
FIG. 2 is a cross section of one of the sectional members of the filter of FIG. 1.

FIG. 2 is a cross section of one of the sectional members 1 of the slotted filter. By preference, these sectional members 1 slightly taper towards the inside of the filter, so that a kind of predistribution of the medium is effected before the slots. During the pressure pulse the liquid will then be pressed outwardly through the slots more easily, so that the filter cake will be dissolved better.

Figure 3:
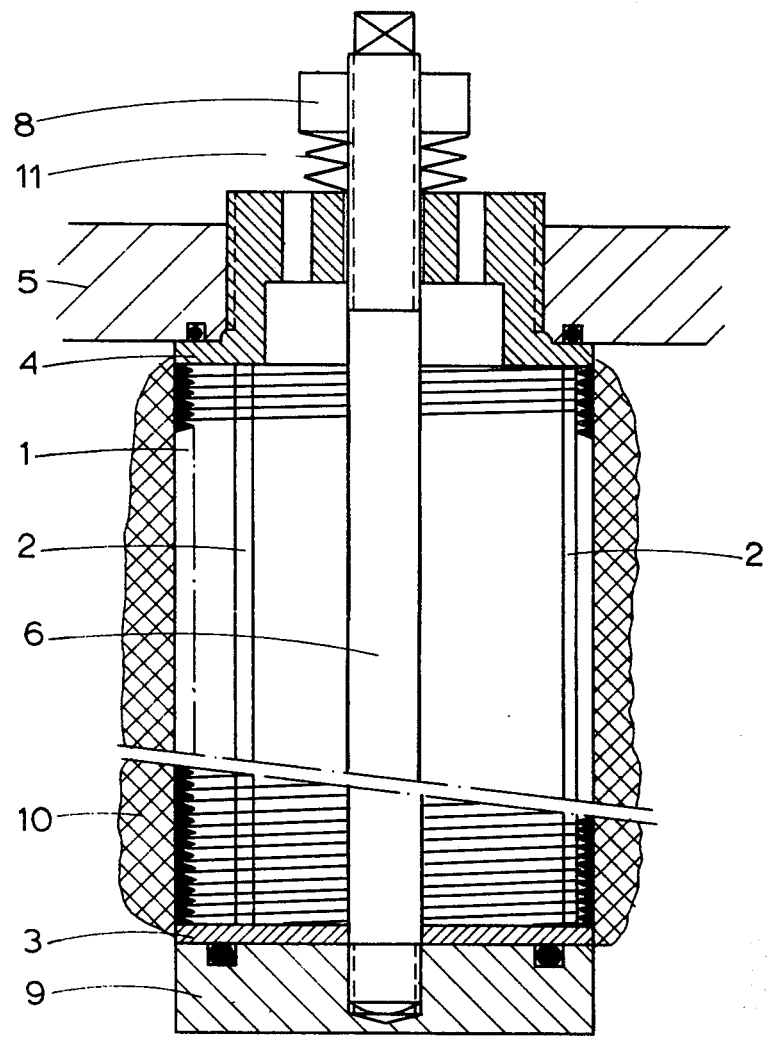
FIG. 3 is a vertical sectional view of a modified candle.

FIG. 3 shows a variant of the tension member. In principle, the tension rod 6 has been maintained, but a spring has been fitted under the tightening nut 8. The required tension is now produced by a spring, in this case the cupped springs 11.

For a satisfactory performance of the filter candle according to the invention it is necessary that the reverse fluid pressure pulse rapidly builds up and lasts for at most some tenths of a second, not more than about 0.4 second. Of course, this is only possible if the resistance of the filter is high, it being furthermore implied that the slot width must not be large. As a rule, a pressure pulse of 3 bars is required to effect the required results.

According to the invention the openings between the sectional members do not exceed about 20 microns and the sectional members are fastened, at least in three points, to stay rods mounted approximately parallel to the axis of symmetry, the whole of connected sectional members being kept compressed during filtration by a tension member. Means is provided for interrupting the filtration at regular intervals and reversing the direction of flow of the filtrate and at the same time exerting a pressure pulse on the inner surface of the bottom of the filter candle, the pretension being such that the stay rods are virtually relieved during the pressure pulse.

The medium may be either a liquid or a gas. The particles to be separated may be of the order of 1 to 10 microns in the filter described. If the medium is an incompressible liquid, the pressure pulse may exert pressure on the bottom by the liquid. If a gas loaded with particles is filtered, it may be necessary, because of the compressibility of the gas, to promote the pressure pulse by mechanical means. To this end, pressure may be exerted for a short time on the cupped springs shown in FIG. 3 by external mechanical means during the reversal of the flow of the medium in the filter.

During a filtering operation fluid medium and dispersed particles flow in the direction of arrows 20 so that particles form a filter cake 10 on the outside of the filter. The fluid passes through the slots between the section members into the interior of the filter and then out through lines 22, 24 and 26. Periodically the flow of fluid medium is stopped by closing a valve 28 in the line 26. Then a reverse fluid pressure pulse is applied to the interior of the filter by any suitable means such as a piston and cylinder illustrated schematically at 30. A check valve 32 in the line 34 connecting the piston and cylinder 30 with the line 26 prevents flow into the piston and cylinder during filtration. The reverse pressure pulse is of sufficient magnitude to widen the slots between the filter members 1 and to cause a small back flow of fluid medium through the slots.

It should furthermore be noted that the result obtained by means of the device according to the present invention cannot be obtained by means of the device according to Swiss patent specification No. 438,220. If a short pressure pulse should be produced in this filter, the openings between the sectional members will certainly not be enlarged in all places, since the annular sectional members are not fastened to each other, but are separated by discs.

According to an embodiment use is made of a slotted filter candle with a diameter of 70 mm and a length of 600 mm. The number of stay rods of about 1 × 1 mm was 16 and the number of slots 540. The tension in the tension rod was about 200 kg (10 kg/mm²). The slot width in the untensioned condition was 7 microns and in the tensioned condition 6.5 microns. The slot widths were enlarged to 7 microns by exerting a pressure pulse for about 0.06 second. This filter was used to filter a catalyst with a particle size of $1 \cdot \mu < d < 8 \mu$ from an acid aqueous medium from a part flow of a reactor. When a pressure pulse was exerted every 30 minutes, the filter cake of catalyst particles could be made to recirculate. The filtration was carried out at a constant throughput of 100 l/h. One liter of filtrate was washed back every pressure pulse.

The application of the central tension rod at a very specific pretension is essential. It has been demonstrated by trial and error that without such a tension rod, after 500 pressure pulses, during about 250 operating hours, the slotted holes have become enlarged and non-uniform in slot width owing to plastic deformation of the thin stay rods. It is obvious that in case the tension stress is too great the slots are opened insufficiently during the back-washing.

The pretension may also be effected with the aid of means fitted outside the filter. This will preferably be done when a number of filter candles is arranged in parallel. It will then suffice to use a joint bottom plate and a limited number of tension members.

What is claimed is:

1. A process for filtering particles from a stream of fluid in which the particles are carried, comprising: flowing the stream radially through a circumferential wall formed of sectional members which are axially spaced apart a predetermined distance so as to form slots therebetween of uniform predetermined width, said predetermined width not exceeding about 20 microns, the sectional members being permanently fixed at least in three points to stay rods that are approximately parallel to the axis of the wall and disposed uniformly about said axis; maintaining the stay rods in a state of axial compression during such flow by means of a tension member extending between end pieces which apply compression to the stay rods; interrupting the stream at intervals and effecting a reverse fluid flow while applying a pressure pulse to one of the end members in a direction to increase the axial spacing between sectional members, the pressure pulse being of sufficient magnitude to enlarge the slots by more than 5% and to create a back flow of fluid through the slots thereby removing any accumulated particles from the slots, the tension in the tension member being preadjusted such that during the pressure pulse tension in the tension member is increased and the compression of the stay rods is substantially relieved whereby plastic deformation of the stay rods is avoided during repeated pressure pulses so that the uniform predetermined slot width during filtration is maintained.

2. A process as in claim 1 wherein the duration of the pressure pulse is less than one second.

3. A filter candle comprising rotationally symmetrical section members arranged about an axis of symmetry so as to form a circumferential wall, said members being spaced apart a predetermined distance to form slots of uniform predetermined width, said predetermined width not exceeding about 20 microns, the sectional members being permanently fixed in at least three points to spaced apart stay rods which are generally parallel to said axis of symmetry, an end piece associated with each end of the circumferential wall, tension means extending between the end pieces, said tension means normally maintaining the stay rods in compression and normally maintaining a maximum spacing between said section members during flow of fluid through the circumferential wall, means for applying a pressure pulse to one of said end pieces in a direction to increase the spacing between said section members when it is desired to backwash the filter, the tension in said tension means being of a magnitude such that the compression of the stay rods is substantially relieved and said spacing between section members increases upon the application of said pulse.

4. A filter candle as in claim 3 wherein said tension means includes a rod disposed within the filter along said axis of symmetry, said rod being elastically deformed in the lengthwise direction during a reverse fluid pressure pulse.

5. A filter candle as in claim 4 including a spring which maintains said rod in tension.

6. A filter candle as in claim 3 wherein said means for applying a pressure pulse includes means for interrupting fluid flow to the filter and for reversing the direction of flow and simultaneously applying a fluid pressure pulse inside said circumferential wall.

* * * * *